United States Patent [19]
Sumi

[11] 3,867,193
[45] Feb. 18, 1975

[54] PROCESS OF PRODUCING A THIN FILM CIRCUIT

[75] Inventor: Norio Sumi, Tokyo, Japan

[73] Assignee: Iwatsu Electric Co., Ltd., Tokyo, Japan

[22] Filed: Nov. 5, 1971

[21] Appl. No.: 195,937

[30] Foreign Application Priority Data

Dec. 28, 1970 Japan ............ 45-19262
Dec. 28, 1970 Japan ............ 45-19263
Dec. 28, 1970 Japan ............ 45-19264

[52] U.S. Cl. ............ 117/212, 117/217
[51] Int. Cl. ............ B44d 1/18
[58] Field of Search ............ 117/212, 217, 227

[56] References Cited

UNITED STATES PATENTS

| | | | |
|---|---|---|---|
| 3,221,199 | 11/1965 | Yanagisawa | 117/212 X |
| 3,256,588 | 6/1966 | Sikina et al. | 117/212 |
| 3,257,592 | 6/1966 | Maissel | 204/38 A |
| 3,386,894 | 6/1968 | Steppat | 117/212 X |
| 3,423,646 | 1/1969 | Cubert et al. | 317/234 |
| 3,461,347 | 8/1969 | Lemelson | 317/101 |
| 3,542,654 | 11/1970 | Orr | 156/3 |
| 3,699,011 | 10/1972 | Nishimura | 117/212 |
| 3,718,565 | 2/1973 | Pelletier | 117/217 |
| R27,287 | 2/1972 | Lepselter | 117/212 |

*Primary Examiner*—Cameron K. Weiffenbach
*Attorney, Agent, or Firm*—Maleson, Kimmelman & Ratner

[57] ABSTRACT

A thin film circuit having a high reliability may be produced by depositing an electrically conductive thin film composed of tantalum, tantalum nitrides, niobium or hafnium on a substrate of an insulating material, and forming capacitors or resistors on the substrate from the deposited thin-film while oxidizing the portions other than these elements to change them into a non-conductive film.

3 Claims, 14 Drawing Figures

PROCESS OF PRODUCING A THIN FILM CIRCUIT

Figure 1:
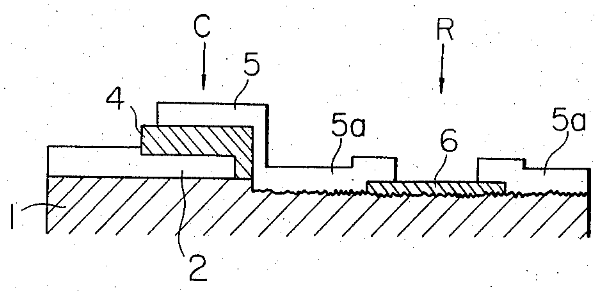

The present invention relates to a process of producing a thin film circuit on a substrate of insulating material, and in particular relates to a process of producing a thin film circuit which comprises depositing an electrically conductive thin film composed of tantalum, niobium or hafnium metals or tantalum nitrides, on the substrate of insulating material forming a capacitor or resistor on the substrate by using the deposited thin-film while thermal oxidizing the portions other than these elements to change them into a non-conductive film.

Also, the present invention relates to a process of producing a thin film circuit wherein a capacitor and a resistor may be both simultaneously and simply produced.

There have been, heretofore, various methods of producing capacitors and/or resistors on a substrate and many attempts have been made. They have, however, the disadvantages that the operating processes are complicated or lack reliability. For example, if an undercoat is not applied to the substrate surface, the action of etchants on the surface of the substrate results in the disadvantage that owing to the roughness of etched surface a thin film resistor formed thereon fluctuates in resistance value and lacks reliability. For these reasons, when a metal film is attached as a counter electrode of a capacitor, it must be formed more thickly than necessary in order to avoid disconnection at the boundary caused by etching the substrate.

On the other hand, if an undercoating film (in general, several hundreds of angstroms) is first applied to the substrate surface one important disadvantage is that further processing is needed. As a whole all the conventional methods are those in which a capacitor element, a resistor element and thus a thin film circuit may be produced by repeating a process comprising film-evaporation, photoresist-coating, etching, removal of photoresist film, and the like, and thus there are many production steps in which the yield and reliability of the resulting circuit may be impaired.

It is, therefore, an object of the present invention to remove said defects.

It is an another object of the present invention to provide a process of producing a thin film circuit containing capacitor elements and resistor elements on an insulating substrate having a high reliability.

In accordance with the present invention the process of producing a thin film circuit comprises depositing an electrically conductive thin film selected from the group consisting of tantalum, niobium and hafnium metals and tantalum nitrides, on the substrate of the insulating material, with an oxidation preventive mask having a pattern corresponding to the shape of the thin film element to be formed on the conductive film, thermally oxidizing the portions of the conductive film other than those coated with the oxidation preventing mask selectively to form an oxide film, removing said oxidation preventing mask, and further applying the necessary working to the non-oxide conductive film to produce the required thin film element.

According to one characteristic of the present invention, the thin film circuit may be produced by depositing the conductive film composed of the desired material on the substrate of insulating material, applying the oxidation preventive mask having a pattern corresponding to the shape of the thin film capacitor element to be formed on said conductive film, thermally oxidizing the portions of the conductive film other than those coated therewith to form the oxide film, removing the oxidation preventive mask, anodizing the surface portions of the non-oxide conductive film corresponding to the capacitor elements portion to form a dielectric layer, coating a metal film corresponding to the resistor element portion on the oxide film to form the desired pattern of a resistor film by the conventional etching process or metal masking process, and further coating a conductive film for use as the counterelectrode of the capacitor and for conducting paths between the counter electrodes of the capacitors and the resistors where necessary.

According to another characteristic of the present invention a thin film circuit may be produced by depositing a conductive film composed of the desired material on the substrate of insulating material, coatig the desired pattern of the oxidation preventive mask on the portions of the conductive film intended to be capacitors and resistors, thermally oxidizing the portions of the conductive film other than that coated with the oxidation preventing mask selectively to form an oxide film, removing the oxidation preventive film, anodically oxidzing the surface portion of the conductive film intended to be the capacitor element portion to form the dielectric layer, adjusting the resistance value of the conductive film intended to be the resistor element portion by means of any appropriate methods such as anodization trimming to form the resistor elements, and further applying a conductive film to form the counter electrodes of the capacitor elements and connecting paths between the capacitor elements and resistor elements where necessary.

It is one advantage of the present invention that since the present invention contemplates to mask the predetermined portions of the conductive film of a thickness of several thousand angstroms coated on the substrate with the oxidation preventive mask and to oxidize the unmasked portions to form the oxide film, both thin film capacitor elements and thin film resistor elements are completely surrounded by the oxide film which results in the thin film element having good reliability. Further, the surface of the substrate is not etched because the etching process is not used. In particular, with the thin film capacitor element it is possible to reduce the thickness of the counter electrode.

It is another advantage of the present invention that since the present invention contemplates to mask only the portion intended to be the base electrode of the capacitor element and the portion intended io be the resistor with the oxidation preventing mask, whereby accomplishing the capacitor and resistor portions as separate elements and to apply conductive films for the counter electrode of the capacitor element and for the connecting paths on the predetermined positions simultaneously, there is no need to first form the film for a dielectric and then the film for a resistor twice over by means of spattering or evaporation as in the conventional production method and further it is possible to create the patterns of the capacitors and the resistors by carrying out one-step only of a thermal oxidation which results in a remarkable reduction in the processing stages. In addition, the possibility of reducing the thickness of the counter electrode of the capacitor element to the minimum provides a number of advantages such as improvement in yield, reduction in cost, etc.

The materials of the thin film circuit according to the present invention may be selected from a group consisting of tantalum, niobium and hafnium metals and tantalum nitrides. Au or Pt may be used as the oxidation preventing film used in the present invention.

In the process of producing the thin film circuit according to the present invention the capacitor element is formed by applying anodic oxidation treatment to the non-oxide conductive film, and the resistor element is formed from the non-oxide conductive film per se or by applying any appropriate methods such as a trimming treatment to said film.

In the present method and thickness of the conductive film formed on the insulating substrate is 2,000 – 10,000 A, preferably 4,000 – 6000 A.

With a thickness less than 2,000 A short circuit of the capacitor frequently occurs and the yield of the product is poor.

A thickness greater than 10,000 A may be also used, but there is no particular advantage.

Figure 2A:
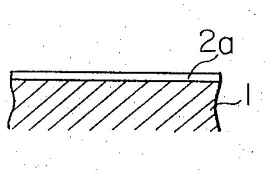
Figure 2B:
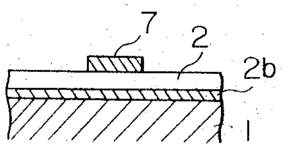
Figure 2C:
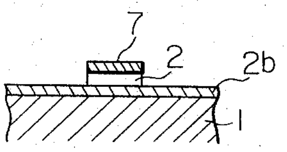
Figure 2D:
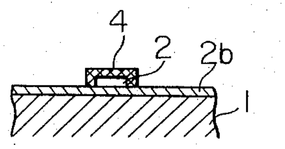
Figure 2E:
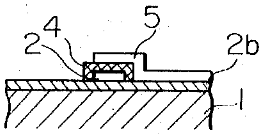
Figure 3A:
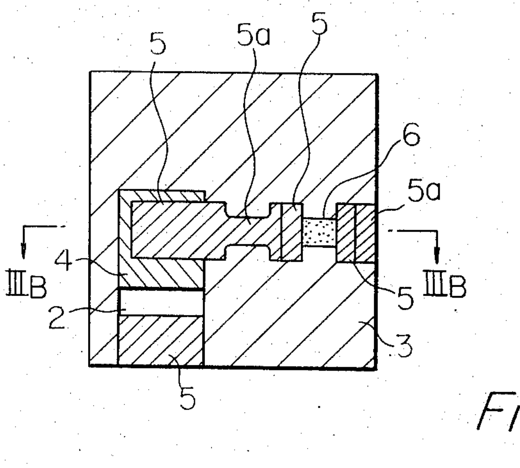
Figure 3B:
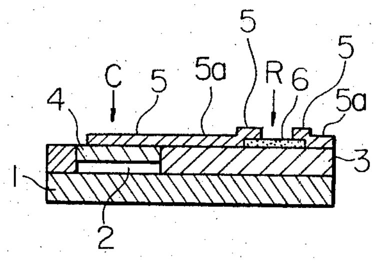
Figure 4A:
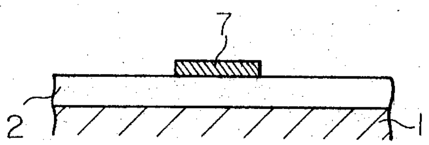
Figure 4B:
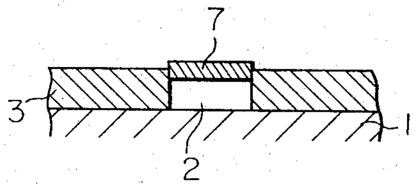
Figure 4C:
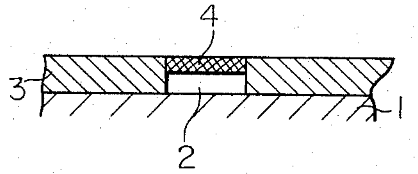
Figure 4D:
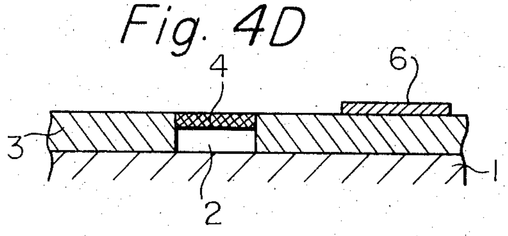
Figure 5:
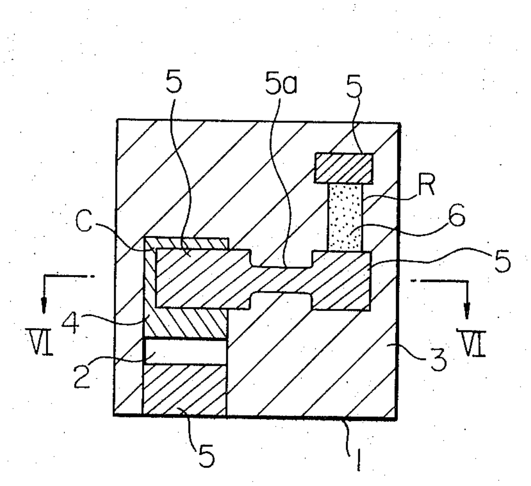
Figure 6:
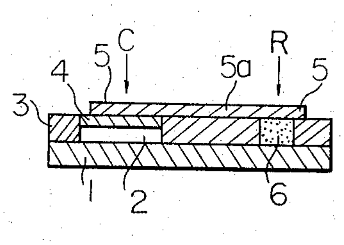

The invention will be further illustrated by the following examples with reference to the attached drawings wherein;

FIG. 1 is a cross section view of an embodiment of a C-R circuit element produced by the conventional process, FIGS. 2A, 2B, 2C, 2D and 2E are cross sectional illustrative views representing the production of the thin film element by the conventional process, FIG. 3A is a plan view of an embodiment of a C-R circuit element produced by the process of the present invention, FIG. 3B is a cross sectional view along line IIIB—IIIB of FIG. 3A, FIGS 4A, 4B, 4C and 4D are cross sectional illustrative views representing the production of a thin film element by the process of the present invention, FIG. 5 is a plan view of another embodiment of a C-R circuit element produced by the process of the present invention, and FIG. 6 is a cross sectional view along the VI—VI line of FIG. 5.

In the drawings like characters are employed to designate the same parts.

FIG. 1 is a cross sectional view of a C-R circuit element produced by the conventional process wherein a film of undercoating film is not applied to the substrate surface. Substrate 1 is an insulating material on which the conductive film such as tantalum, intended to be the base electrode 2 of the capacitor element C is coated to form the desired pattern of the base electrode 2 by etching, and the surface thereof is anodized to form the dielectric 4 such as $Ta_2O_5$. Conversely the appropriate portion of the substrate 1 is coated with the resistor film 6 intended to be the resistor element R such as Ta, $Ta_2N$, and finally the conductive film *5a* for the counter electrode 5 of the capacitor C and the conducting paths are coated on the required portions.

In accordance with such conventional processes, if the pattern of the base electrode 2 is formed by the etching process, the surface of the substrate 1 is overetched, and therefore a metal, for example, the conductive film 5 to be coated thereon requires considerable thickness in order to avoid defects such as a break at the boundary between the surface and the film. Also, when the thin film resistor element is formed on the etched substrate 1 the resulting resistance value is influenced by the roughness of the surface of the substrate 1 which results in unreliability.

The production process of a thin film capacitor element with under lay according to another conventional process will be illustrated with reference to FIGS. 2A to 2E. A thin tantalum film 2a having a thickness of several hundred angstroms is coated all over the substrate 1 of insulating material (FIG. 2A), and the film *2a* is thermally oxidized to form a thin $Ta_2O_5$ film *2b*. Then, the oxide film 2b is coated all over with a Ta film 2 and the Ta film 2 is coated with an organic photoresist 7. The coated photoresist film is exposed to ultraviolet rays through a predetermined pattern photoresist mask. Then, the remainder other than the parts exposed to the rays is removed (FIG. 2B). After an etching is finished as shown in FIG. 2C, the coating 7 is removed and the remaining film 2 is anodically oxidized to form a dielectric 4 (FIG. 2D). Finally, a counter electrode 5 is coated onto the dielectric 4 to create the thin film capacitor element (FIG. 2E).

This process has the great disadvantage that complication in the processing stages can not be avoided.

As one example of the present invention, the process of manufacturing the C-R circuit element shown in FIGs. 3A and 3B will be illustrated with reference to FIGS. 4A to 4D.

At first, for example, Ta is coated all over the substrate 1 composed of glass, ceramic, etc. to form the conductive film 2 having a thickness of several thousand angstroms. Then, an oxidization resisting material such as Au or Pt is coated in the form of the pattern of the base electrode on the film 2 to make an oxidation preventive mask 7 (FIG. 4A).

The portions other than that coated with the oxidation preventing mask 7 are thermally oxidized completely by using an appropriate temperature and time to form an oxide film 3 such as $Ta_2O_5$ (FIG. 4B). Then, the oxidation preventing mask 7 is removed and the upper portion of the remaining metal film intended to be the base electrode is anodically oxidized under the required conditions to form a dielectric layer 4 (FIG. 4C).

Thereafter, as shown in FIG. 4D, tantalum is deposited on the oxide film 3 to a thickness of about 1,000 A and the deposited Ta is shaped into the desired pattern by photo-etching or by using a mechanical mask to form the resistor element 6 of the resistor R.

Finally, an intermediate film such as Ni or Ni-Cr, is deposited on the required portion to a thickness of several hundred angstroms (not shown), and a metal such as Ni, Au, Cu or Al is further deposited thereon to a thickness of several thousand A as a whole to form a conducting layer, whereby the counter electrode 5 of the capacitor C and simultaneously a conductive film *5a* for the connecting paths is deposited to provide the thin film circuit. The intermediate film of Ni or Ni-Cr is effective for enhancing the adherence of the oxide film to the Ni, Au, Cu or Al film.

Additionally, when the thin film resistor element is to be formed the oxidation preventing mask is subjected to phot-etching or metal mask evaporation as shown in FIG. 4A to form the desired resistor pattern or alternatively the oxidation preventing mask 7 is removed as shown in FIG. 4B and the exposed portion is subjected to etching or anodic oxidation to form the desired resistor pattern, by forming theron a conductive film having any appropriate thickness and consisting of the same material as the counter electrode 5 in FIG. 3B.

The method of the present invention will be illustrated with a C-R circuit using Ta and in reference to FIG. 5 and FIG. 6.

First, the conductive film of tantalum which forms the base electrode 2 of the capacitor C and the resistor 6 is deposited all over the substrate 1 in an appropriate thickness of about several thousand angstroms by means of sputtering or evaporation. In order to make the patterns for the base electrode 2 of the capacitor element C and for the resistor element 6, an oxidation resisting film of Au or Pt is deposited on the upper portion of the conductive film in the patterns of the base electrode and the resistor to form the oxidation preventing mask. The portions other than that covered by the mask are thermally oxidized by using any appropriate temperature and time to oxide the film 3 of $Ta_2O_5$. Then, the mask is removed and the conductive film portion of the capacitor element C, that is, the upper portion of the base electrode 2 is oxidized by means of anodic oxidation to form a dielectric 4 of $Ta_2O_5$. Thereafter, in like manner the oxidation preventing mask on the resistor element R is removed and the resistance is adjusted to the desired value by any convenient means such as anodization trimming. Next, on intermediate film such as Ni or Ni-Cr is deposited onto the required postion in a thickness of several hundred angstroms (not shown) and a metal such as Ni, Au, Cu or Al is further deposited thereon to form in a total thickness of several thousand angstroms conductive film for the counter electrode 5 of the capacitor element and connecting paths between the counter electrode 5 and the resistor film 6 with the result that the thin film circuit contains the capacitor element C and the resistor element R. In this case, the order of production of the capacitor element C and the resistor element R may be reversed without causing any troubles. Also, the resistor film 6 may be subjected to trimming if needed.

The above examples have been directed to the thin film circuit using tantalum material, and it is to be understood that any appropriate materials such as tantalum nitrides, niobium, hafnium may be used.

The invention has been described in detail with particular reference to a preferred embodiment thereof, but it will be understood that variations and modifications can be effected within the spirit and scope of the invention as described hereinabove.

What I claim is:

1. A process of producing a C-R thin film circuit which comprises the steps of:

a. depositing an electrically conductive thin film on an insulating substrate, said thin conductive film being selected from the group consisting of tantalum nitride, tantalum, niobium, and hafnium;

b. coating onto said conductive film an oxidation preventing mask, said mask coating having a pattern corresponding to the contour of a thin film element desired to be formed on said conductive thin film;

c. oxidizing portions of said conductive thin film not coated with said oxidation preventing mask to product an insulating oxide film layer which has a thickness larger than that of said conductive thin film and insulates the mask-coated portions of said conductive thin film at side surfaces thereof;

d. removing said oxidation preventing mask to expose the portions of said conductive thin film at upper surfaces thereof, said exposed portions of said conductive thin film which have not been oxidized being insulated at said side surfaces with said insulating oxide film layer;

e. anodizing the upper surface of said nonoxidized conductive film to form a thin film dielectric layer over the remaining non-oxidized conductive film; and, f. depositing a metal film in a predetermined pattern on said dielectric layer to form a thin film capacitor element.

2. A process of producing a C-R thin film circuit which comprises the steps of:

a. depositing an electrically conductive thin film on an insulating substrate, said thin conductive film being selected from the group consisting of tantalum nitride, tantalum, niobium, and hafnium;

b. coating onto said conductive film an oxidation preventing mask, said mask coating having a pattern corresponding to the contour of a thin film element desired to be formed on said conductive thin film;

c. oxidizing portions of said conductive thin film not coated with said oxidation preventing mask to produce an insulating oxide film layer which has a thickness larger than that of said conductive thin film and insulates the mask-coated portions of said conductive thin film at side surfaces thereof; and, d. removing said oxidation preventing mask to expose the portions of said conductive thin film at upper surfaces thereof, said exposed portions of said conductive thin film which have not been oxidized being insulated at said side surfaces with said insulating oxide film layer;

e. anodizing at least one portion of said non-oxidized conductive film to form a thin film dielectric layer; and, f. depositing metal electrodes to form a resistor element.

3. A process of claim 2 wherein said thin film element is adjusted by anodization trimming of said dielectric layer.

* * * * *